July 6, 1954 I. W. MARTIN 2,682,876

METHOD OF PREPARING CARDS FOR CARD FILING SYSTEMS

Filed Oct. 5, 1949 2 Sheets-Sheet 1

INVENTOR
IRA W. MARTIN
BY
Emery, Varney, Whittemore & Dix
ATTORNEYS

July 6, 1954 I. W. MARTIN 2,682,876

METHOD OF PREPARING CARDS FOR CARD FILING SYSTEMS

Filed Oct. 5, 1949 2 Sheets-Sheet 2

INVENTOR
IRA W. MARTIN
BY
Emery, Varney, Whittemore & Dix
ATTORNEYS

Patented July 6, 1954

2,682,876

UNITED STATES PATENT OFFICE 2,682,876

METHOD OF PREPARING CARDS FOR CARD FILING SYSTEMS

Ira W. Martin, Rye, N. Y.

Application October 5, 1949, Serial No. 119,655

2 Claims. (Cl. 129—16.7)

The present invention relates to improvements in the filing art.

In the ordinary library or record filing, indexing and cataloguing system, the record or reference data is written, printed or typed in characters of easily readable size on standard file cards measuring about 3 by 5 inches or any desired size. These cards are classified and arranged in proper sequence in drawer trays or receptacles slidably set in file cases or cabinets and repose loosely and freely in these trays to permit their easy individual removal therefrom, or the cards are provided with round holes for impalement on endwise slidable holding rods extending along the bases of the trays. Such a file system has the disadvantage of occupying a great deal of space, and with the ever increasing amount of literature being produced and requiring indexing, cataloguing and classifying, the problem of library space is becoming very serious and in some cases critical.

Moreover, in prior systems, the file cards are handled manually in the process of selection, and as a result become quickly soiled and worn. Furthermore, in the case where these cards are impaled on to a holding rod, the process of adding a card or removing it from a batch in a tray is time consuming and involves the operation of pulling out the rod to release the cards therefrom, inserting the card into or taking it out of the batch, aligning the cards in the tray and restoring said rod into card transfixing position.

One of the features of the present improved invention is to provide a new and improved filing system which makes it possible for voluminous indexes, case histories, court records, and other documents to be available in compact reduced form requiring comparatively small and greatly reduced file cabinet space.

Another feature of the invention is to provide a new and improved method of preparing a record card file system occupying a minimum of file cabinet space.

One of the objects of the invention is to provide a method by which a standard file, such as a standard library reference file, may be expeditiously and comparatively inexpensively converted into a file of greatly reduced size, without reducing the amount of file data available.

A further object is to provide as a new method of producing a file card which bears data that is of reduced micro-size and which data is located on the card in position for magnified projection on a screen.

Another feature of the invention, is to provide a method of producing a file card having a specially designed slot by which said card may be easily mounted on or removed from a lock-bar, adjusted into registry with other cards on said rod and locked in transfixed position thereon.

In carrying out certain features of the present invention, the different data items to be indexed, catalogued or filed are photographed contiguously in sequence and in reduced diminutive size on a film or other suitable light sensitized material. The items of data are then printed successively and in sequence from the film on to a continuous sensitized positive web along one side of said web. The web is then cut transversely into individual cards, each bearing a photographically printed item of data at one end, and then a slot is punched near the other end, and is specially designed to provide gauge means by which the cards may be accurately cut during the operation of severing the web into individual cards, whereby proper registration of said cards may be attained when mounted or bound in a file tray.

The cards as they are cut and slotted are assembled or stacked in proper sequence, so that when they are placed in a file tray they will be in proper order.

The individual cards produced are usually of oblong generally rectangular shape and have a width which is a great deal less than that required if the data printed thereon were of visible standard size. These cards are supported in upright position in a tray having a corresponding elongated cross-section. As a result, a number of these trays arranged alongside of each other will occupy the same file cabinet space as is occupied by a single standard tray, while carrying a correspondingly increased number of index or file cards.

The tray carries a card registering lock-bar extending along the bottom thereof and specially designed to cooperate with the slot at the bottom of the cards. This bar is supported for turning movement about its longitudinal axis between card locking and releasing positions. When turned into released position, the bar without being pulled out, permits a card to be taken out of a batch by the simple manipulation of pulling the card out edgewise from the batch and permits the card to be added to said batch and into impaling engagement with said bar by the simple manipulation of slipping the card into said batch edgewise. When the cards have been properly aligned, a simple turning of the bar locks the cards in position.

Various other objects, features and advantages of the invention will be apparent from the following description and from the accompanying drawings, in which.

Figure 1:
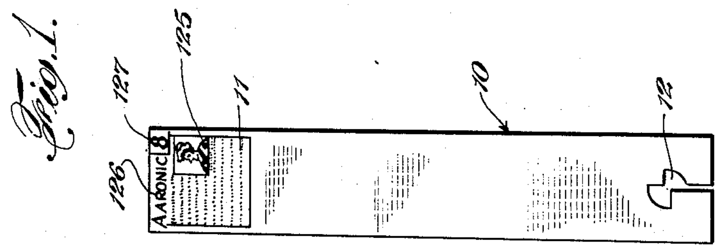
Fig. 1 is a front face view of a file card embodying certain features of the present invention.
Figure 3:
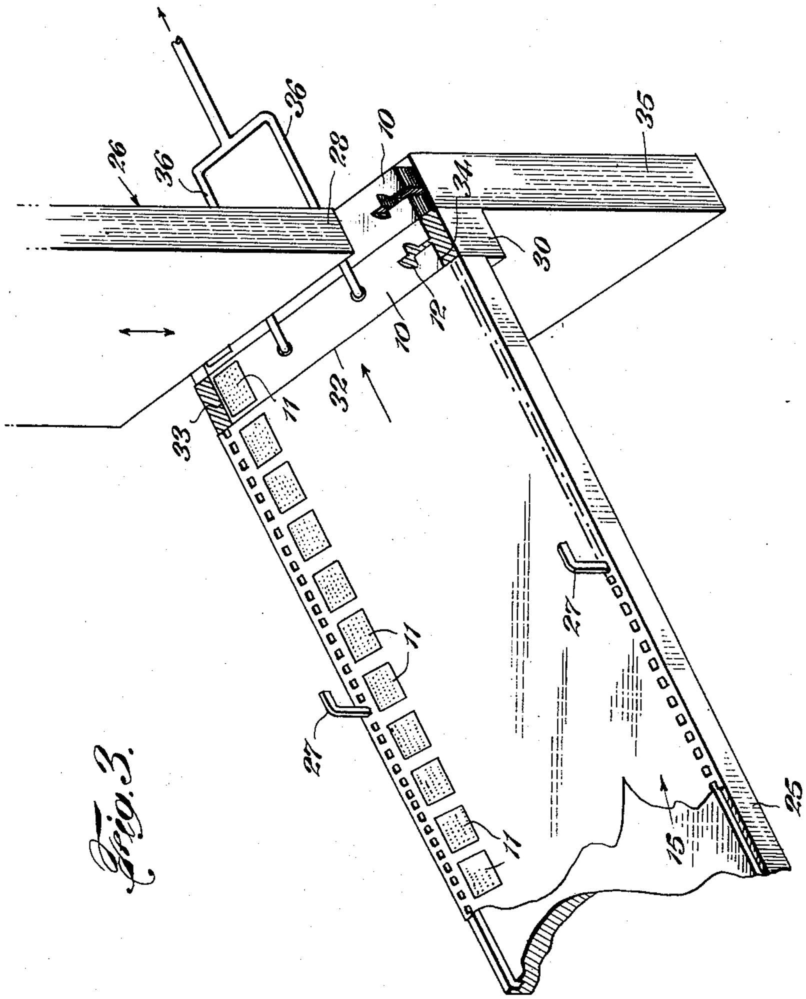
Figure 4:
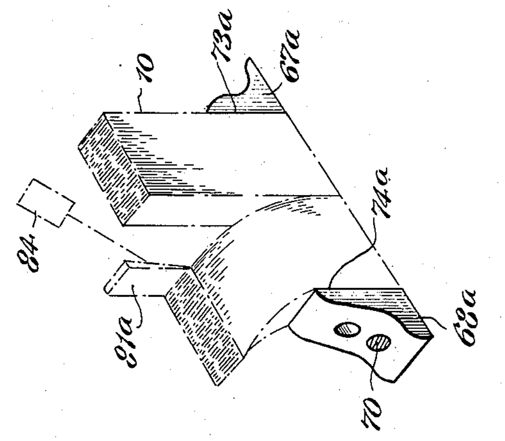

Fig. 3 is a diagrammatic perspective view of a subsequent step in the process of making the file card of Fig. 1, and shows the printed web being severed into individual card sections, simultaneously punched to form the locking slots at one end and stacked in proper order in preparation for binding in a file tray; and Fig. 4 is a perspective of a form of device for binding a batch of file cards in a file tray.

Referring to Fig. 1 of the drawings, there is shown a file card 10, which as an article of manufacture embodies certain features resulting from the practice of the present invention. This file card 10 is made of any suitable resiliently flexible sheet material capable of being light sensitized and photographically printed, and may be of suitable form-sustaining paper or plastic. The file card 10 is provided preferably in strip form and more specifically in the form of a rectangular oblong having a length many times its width and bears an item of data 11 on an allocated area thereof, preferably near the upper end. This data information preferably includes a drawing or picture 125, an unmagnified index word 126, and an index number 127. It will be understood that these may be varied as desired in size and position. This card is also provided with a specially designed slot at its lower end, by which it may be releasably secured onto a lock-bar, as will be hereinafter more fully described.

In the process of making the file cards 10, the data is first photographically reduced to diminutive or micro-size on a negative film in a manner well known in the microfilming art, so that the impressed items of data are arranged successively, contiguously and in proper file order along the film. The data may be photographically impressed on standard film of 8 mm., 16 mm., 35 mm. or 70 mm. size, according to the size of the data item and the use to which the filing system is to be placed. For example, for library filing or reference systems, a film of 16 mm. may be found suitable.

Figure 2:
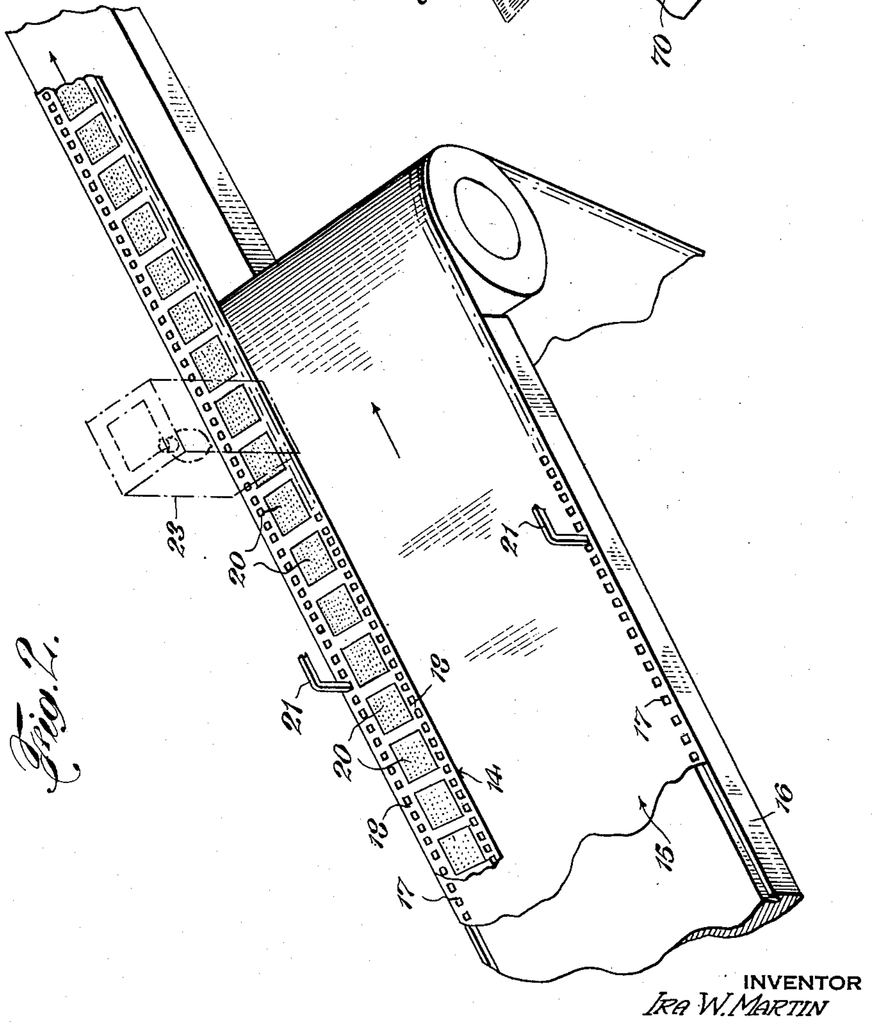
Fig. 2 is a diagrammatic perspective view showing the step of progressively printing on a continuous positive web the successive data items from a negative microfilm, in the process of making the file card of Fig. 1 according to certain features of the present invention.

The data item which is reduced in size and photographically impressed on the film may constitute typed, printed, written, drawn or photographed material, such as that carried on file cards, letters, documents, sketches, plans, drawings and photographs. In a case where the present invention is to be adapted to a library file system and where it is desired to convert the existing system to the system of the present invention, an automatic 16 mm. photographing machine may be employed to make a micronegative of all of the 3 x 5 file cards, the respective items from these cards extending along the film in the order in which these cards are arranged in the standard file tray. After the negative microfilm 14 (Fig. 2) has been made as described, either for library or for any other suitable use, a continuous positive print is made therefrom in a progressive printer on a continuous web 15 of sensitized material, as shown in Fig. 2. This web 15, which is made of material from which the individual cards shown in Fig. 1 are made, is fed along a support 16, and is shown provided along the opposite edges with a series of feeding holes 17 corresponding to the standard feeding holes 18 along the edges of the negative microfilm 14.

The negative microfilm 14 which is narrower than the positive sensitized web 15 and which carries the photographed items 20 consecutively in proper sequence thereon, is superimposed on said web with its holes 18 on one side in registry with the holes 17 on the corresponding side of the web, and said film and web are fed intermittently in unison by means of a suitable feeding device shown in the form of rakedown members 21. The film 14 and the web 15 are fed intermittently in registry and in unison with the rakedown members 21 and in steps, each equal to the distance between successive data items 20 on said film, so that each feeding operation brings one of said items directly underneath a light source 23 for printing exposure. The rakedown members 21 are then raised to afford ample time for exposure of the web 15 to the printing action of the light source 23 and to permit their return for the next feeding action. While the members 21 are being moved back to their original positions, any suitable means may be employed to maintain the film 14 and the web 15 in registry.

As a result of the operation described, the data items 20 on the film 14 will be photographically transferred onto the web 15 as a series of data items 11 arranged in proper sequence, as shown in Fig. 3. This sensitized material is then processed and becomes a positive.

The positive web 15 with the data items 11 printed thereon is then fed over a support 25 and intermittently into the field of action of a cutting and punching device 26, as shown in Fig. 3, where the web is cut into single frame strips 10 which bear the respective data item 11 near one end and the locking slot 12 near the other end. The intermittent feeding of the web 15 for this operation may be effected, as for example, by a rakedown device 27. This rakedown device 27 also acts to hold and maintain the web in predetermined positions so that it will not be displaced during the cutting and punching operations.

The cutting and punching device 26 desirably comprises a single die 28 on one side of the web 15 cooperating with a corresponding mating counter 30 on the opposite side. This die 28 is provided with a straight cutting edge for cutting the web 15 transversely along the line 32 to form an individual strip. This die 28 is also provided with suitable cutting members to straight trim the strip along the lines 33 and 34 for cutting off the perforated end sections therefrom, and the die is also provided with a punch for cutting out the slot 12. The sections of the strip punched out and trimmed off are indicated as shaded areas in Fig. 3.

After the strips have been cut into shape to form the file cards 10 shown in Figs. 1 and 3, the cards are stacked in proper sequence in a magazine 35 on the discharge side of the cutting and punching device 26 in any suitable well known manner. The stacking device is shown diagrammatically as a series of fingers 36 reciprocably operable cyclically to engage the strips after they have been cut, trimmed and punched and to feed them into the top of the magazine 35 into which they are dropped for filing. The magazine 35 may have a movable bottom yieldable downwardly in the well known manner, as the filing cards are collected therein. The cards 10, arranged in the magazine 35 in the same sequence as that of the original file cards or records, are bound in this order as shown in Fig. 4. The magazine 35 is desirably of a size to accommodate a trayful of file cards and the stacking operation is conducted and controlled so that each file load of cards from the magazine 35 corresponds to the full batch of cards to be placed together.

In Fig. 4 there is illustrated a form of holding the cards 10 together by employing clamps 67a and 68a having confronting clamp faces 73a and 74a, respectively, extending in planes at right angles to a clamp screw 70 for so holding the cards. A detent 81a is shown in dotted lines for bending the cards to some extent while the assembled cards are passed under the same for viewing. Also, a lamp 84 is shown in dotted lines, which lamp will shine on the top edges of the cards to illuminate the data information thereon.

For the purpose of long life of the cards, it may be desirable to make the front edge of the detent 81a of a length that is relatively short. Thus, when the edges of the card have possibly become worn by the engagement with the particular edge of the detent 81a, a new detent may be inserted having a front edge which would bear at a different position against the edges of the cards. Any suitable arrangement for allowing for engagement at different positions of the edges of the card may be employed. It will also be noted that the arrangement of having the detent 81a engage the edges of the cards is helpful in making sure that only one card at a time will pass beyond the detent, and that the distortion of the card may be easily arranged so that the lens means 84 will have maximum efficiency in the lighting and transmitting the information on each card.

The assembly of the cards in trays in such that the trays may be placed alongside of each other in a suitable file cabinet (not shown). The width of the file trays is only a fraction of the width of the standard file trays containing the same number of record cards. It is seen, therefore, that the file cabinet space occupied by the card assemblies of the present invention is a great deal less than that occupied by standard file trays.

Moreover, since it is necessary to produce a negative of the item of data before being impressed upon the card and since prudence would require this negative to be preserved, there is reasonable assurance that a record of the item is available for replacement purposes in case any of the cards should be surreptitiously withdrawn from the tray or accidentally destroyed or lost.

Although the invention has been described specifically in connection with a library file system, as far as certain aspects of the invention are concerned, it may be applied to other file or record systems. For example, it may be applied in connection with rogue galleries, fingerprint file systems, and the like, and may be used in connection with file systems requiring visible material such as photographs, sheet music, etc. For such visible material, a double exposure print may be made on the card, one-half of the card carrying the text, and the other half carrying a photograph, sheet music or the like relating to this text.

Also, as far as certain aspects of the invention are concerned, the data items may be printed on larger scales, if desired.

While the invention has been described with particular reference to specific embodiments, it is to be understood that it is not to be limited thereto, but is to be construed broadly and restricted solely by the scope of the appended claims.

The invention claimed is:

1. In the method of preparing a card file index system having therein a series of cards normally mounted in a holder and wherein said cards and their holder are of less width by about three-fourths that of the present three by five card and its holder, the steps of providing a web with a portion of it being light sensitive and with a series of evenly spaced holes along each edge to be engaged by a rakedown device which operates to move said web to new positions at predetermined intervals and to hold said web in fixed positions at predetermined times, photographing an indicator and photographing microsize notations along one edge of said web where said web is light sensitive and near one series of said holes and at spaced intervals, said indicator being readable from the opposite edge of said web, said printing being in continuous succession and at predetermined sequence, moving said web into engagement with a mandrel by the movement of said rakedown device, cutting said web crosswise while in contact with said mandrel to form cards of narrow widths, cutting said web lengthwise to remove the edges thereof having holes therein, and cutting an opening in the end of each of the said cards formed by the crosswise cutting, said openings being opposite the ends with said notations thereon, the said openings in said cards receiving means for binding said cards in a holder.

2. In the method of preparing a card file index system having therein a series of cards normally mounted in a holder and wherein said cards and their holder are of less width by about three-fourths than that of the present three by five card and its holder, the steps of providing a light sensitive web with a series of substantially evenly spaced holes along each edge thereof to be engaged by a rake-down device which operates to move said web to new positions at predetermined intervals and to hold said web in fixed positions at predetermined time, photographically reproducing on said web along an allocated area and in reduced diminutive size a series of data items in contiguous succession and in predetermined sequence, intermittently feeding said web by the operation of said rake-down device, holding said web temporarily in predetermined positions, cutting and punching said web to cut off the holed edges thereof and cutting said web between said data items into narrow strips to form a series of narrow file cards, each card bearing a respective data item at one end thereof.

References Cited in the file of this patent

UNITED STATES PATENTS

| Number | Name | Date |
|---|---|---|
| 575,761 | Short | Jan. 26, 1897 |
| 926,204 | Meleney | June 29, 1909 |
| 1,126,645 | Lo Rentz | Jan. 26, 1915 |
| 1,357,653 | Russell | Nov. 2, 1920 |
| 1,367,550 | Jones | Feb. 8, 1921 |
| 1,489,346 | Davis | Apr. 8, 1924 |
| 1,493,835 | Wirt | May 13, 1924 |
| 1,889,575 | Sebille | Nov. 29, 1932 |
| 1,978,381 | Hutchings | Oct. 23, 1934 |
| 2,258,722 | Saunders | Oct. 14, 1941 |
| 2,260,551 | Boni et al. | Oct. 28, 1941 |
| 2,389,923 | Miller | Nov. 27, 1945 |
| 2,431,662 | Ralph | Nov. 25, 1947 |
| 2,476,326 | Sherman | July 19, 1949 |

FOREIGN PATENTS

| Number | Country | Date |
|---|---|---|
| 23,158 | Great Britain | 1898 |
| 9,954 | Great Britain | 1899 |
| 609,520 | Germany | 1935 |
| 815,866 | France | 1937 |